(12) United States Patent
McBurney

(10) Patent No.: US 8,188,707 B2
(45) Date of Patent: May 29, 2012

(54) METHODS AND SYSTEMS FOR A WALL MOUNTED UNIVERSAL POWER SUPPLY

(76) Inventor: A. Scott McBurney, Mercer Island, WA (US)

( * ) Notice: Subject to any disclaimer, the term of this patent is extended or adjusted under 35 U.S.C. 154(b) by 0 days.

(21) Appl. No.: 12/493,003

(22) Filed: Jun. 26, 2009

(65) Prior Publication Data

US 2009/0322279 A1    Dec. 31, 2009

Related U.S. Application Data

(63) Continuation of application No. 11/677,527, filed on Feb. 21, 2007, now abandoned.

(60) Provisional application No. 60/775,585, filed on Feb. 22, 2006.

(51) Int. Cl.
*H02J 7/00*    (2006.01)

(52) U.S. Cl. ......... 320/107; 320/113; 320/114; 320/115

(58) Field of Classification Search .................. 320/110, 320/107, 111–115
See application file for complete search history.

(56) References Cited

U.S. PATENT DOCUMENTS

| | | | |
|---|---|---|---|
| 4,213,079 A * | 7/1980 | Mullersman .................. 320/111 |
| 4,890,217 A | 12/1989 | Conway | |
| 5,039,929 A * | 8/1991 | Veistroffer et al. ........... 320/107 |
| 5,539,821 A * | 7/1996 | Blonder ....................... 379/446 |
| 5,742,149 A | 4/1998 | Simpson | |
| 6,014,010 A * | 1/2000 | Yao .............................. 320/110 |
| 6,054,846 A | 4/2000 | Castleman | |
| 6,172,884 B1 | 1/2001 | Lanni | |
| 6,204,632 B1 * | 3/2001 | Nierescher et al. ........... 320/116 |
| 6,459,175 B1 | 10/2002 | Potega | |
| 6,538,341 B1 | 3/2003 | Lang | |
| 6,590,788 B2 | 7/2003 | Mercier | |
| 6,597,152 B1 * | 7/2003 | Jacobs et al. .................. 320/113 |
| 6,995,542 B2 * | 2/2006 | Yu et al. ........................ 320/113 |
| 7,002,265 B2 | 2/2006 | Potega | |
| 7,039,821 B1 | 5/2006 | Potega | |
| 7,059,769 B1 | 6/2006 | Potega | |
| 7,081,008 B2 | 7/2006 | Tan | |
| 7,122,918 B2 | 10/2006 | Rose | |
| 7,153,169 B2 | 12/2006 | Lord | |
| 2003/0006732 A1 | 1/2003 | Liao | |
| 2005/0225285 A1 * | 10/2005 | Cheng .......................... 320/111 |
| 2006/0289444 A1 | 12/2006 | Jackson et al. | |

* cited by examiner

*Primary Examiner* — Ramy Ramadan
(74) *Attorney, Agent, or Firm* — Foster Pepper PLLC; Richard T. Black

(57) ABSTRACT

Methods and Systems for charging portable equipment having divergent power requirements and exhibiting different structural features are provided by devices having adapters to accommodate the portable equipment in the form of a wall mounted universal power supply. Adapters are configured in plate formats that fit into cradles capable of charging cell phones, video cameras, and wireless routers.

13 Claims, 5 Drawing Sheets

METHODS AND SYSTEMS FOR A WALL MOUNTED UNIVERSAL POWER SUPPLY

PRIORITY CLAIM

This application a continuation of and claims priority to U.S. patent application Ser. No. 11/677,527 filed on Feb. 21, 2007 now abandoned which claims priority from U.S. Provisional Patent Application No. 60/775,585 filed Feb. 22, 2006.

BACKGROUND OF THE INVENTION

Almost all handheld electronic devices in the marketplace today are delivered with a power supply or transformer to either power the device or recharge the battery.

The transformers job is to ensure that the device or battery receive the proper power input for its particular needs. Because each device is unique the power requirements are unique with the end result being that consumers of these devices collect a wide range of transformers in many different sizes and shapes. These transformers oftentimes take the form of a brick with two cords, where one cord attaches to a standard electrical outlet and the other attaches to the device.

The transformers invariably collect in ones home and results in many tangled wires.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
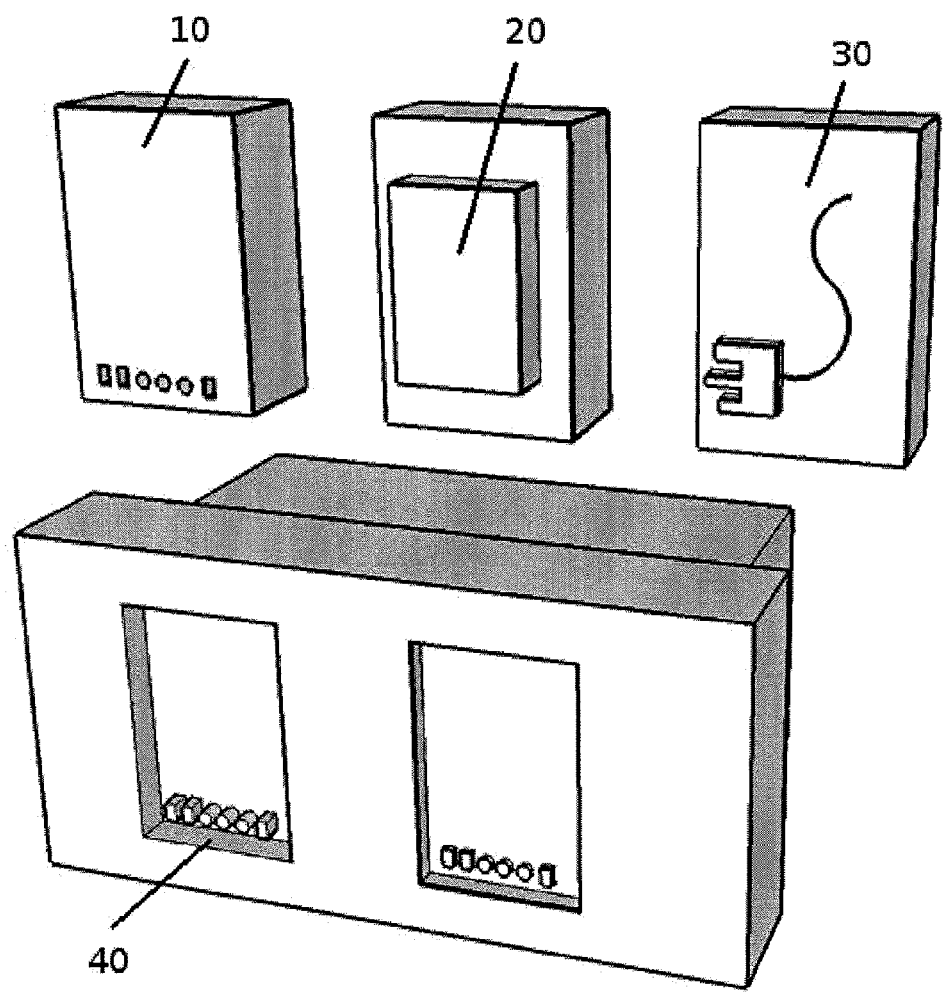
FIG. 1 illustrates a line drawing of an adapter and transformer in one embodiment.

The preferred and particular embodiments described here look to provide a means to charge or power any device without having the tangled wires in the home.

A particular embodiment includes several components. The first component is a switched mode power supply. This will allow the power output to be altered to adjust to the device that is attached. This power supply is constructed to allow for multiple devices to be attached. In some instances the power supply will be configured to allow for 2 devices such as with a standard wall outlet. Other embodiments will allow for many devices to be attached and likely even beyond 10 devices.

The power supply may be built as a switched mode power supply thus enabling programmatic changes to the power output levels as would be needed by different devices. The plates will be designed to fit a specific device and the plate itself can tell how much power its devices needs. There could be other means of enabling different power levels such as over the internet or with USB base devices.

The power supply may be housed in a casing that should fit either into its own housing or that of an electrical junction box. The ability to put multiple or different power supplies with different ranges of capabilities is incorporated into the design. For example one power supply could be built to address higher powered devices and others could be set to power lower output devices. Some housings could hold multiple power supplies as needed. This interchangeability is preferred to ensure that any device power requirement can be met as well as providing flexibility to attach a wide number of devices.

In the case of the power supply fitting within its own housing, the housing will be plugged directly into the wall outlet. In other embodiments the standard outlet or switch itself is replaced within the junction box by the transformer itself.

The housing may allow for the attachment of many different plates in addition to holding the power supply. Some housings will allow for 2 plates while others could allow for more plates. In a "kitchen office" it is likely you could attach 4 cell phones, 2 laptops, a cordless phone, 2 family radios, a camera battery and a video camera battery.

The housing may have several "slots" that will receive the plates. These slots will be identical/universal whether the housing has 2 slots or 12 or more or less. The housing will receive the plates and each plate in turn will be built for a specific device.

Plates may be built for a wide range of devices and purposes. A likely common form of a plate may be one in which the plate houses a retractable cord and a plug to fit a specific device such as a laptop or a cordless phone. Many different plates with different tips to attach to different devices may. be built The user simply needs to pick the appropriate plate for their device. Another common form may be a plate that functions as a cradle for the device itself. For example a cell phone could be placed onto the plate to be both charged and stored. (This eliminates the cord draped across the counter) The plate would be built with the cradle for the device as well as electrical connectors to power and update the device. Electrical connectors in the plate could allow for programmatic updates in addition to the power related connections. Another cradle may be designed for rechargeable batteries as are often found in cameras and video cameras. The battery can be placed in the plate and held there. As with the retractable corded plates there may be multiple different plates for different batteries. The plates themselves also have the ability to be an electronic device themselves. Wireless hubs are found in many homes today and building a plate that performed that function is conceptually possible. Additional devices that could be built include such items as video cameras, light and motion sensors for the room, electronic thermometers and home "weather stations," wireless speakers, and night lights.

The end result is a unit attached to your wall that could store 2 cell phones, 2 Family radio walkie talkies (for example, the Motorola Talkabout devices) 3 batteries, 2 retractable cords can be pulled out to charge a laptop, and a wireless hub.

As users acquire new devices they can acquire a new plate, they would not however need a new transformer, as that is already in place. In addition to the advantage of not having to continually buy another transformer the user gains the advantage of an aesthetically more pleasing and less cluttered area for charging and powering devices.

Up until now, electronics manufacturers have correctly focused on the next "cool gizmo" or feature hoping to win over the public with their latest device. This focus has resulted in such success stories as camera phones, PDA phones, digital video cameras, and handheld gaming devices. While the world has proven that it seems to have an almost insatiable desire for the next new device, we have rapidly collected a plurality of those cumbersome, annoying, proprietary, often-expensive, never-available transformers to recharge the ever growing pile of electronics. One preferable solution, in one embodiment, is a transformer with an interchangeable adapter that provides a retractable cord and plug or connector that is capable of attaching to any device.

All electronic devices need power to run and at present it takes little imagination to recognize the growth potential in the handheld electronics industry. While a single cell phone in a family was extravagant even 12 years ago, now families with 3 teenage children will likely have 3 to 5 phones in the home. Laptop computers sales have exceeded desktop purchases and will continue to grow market share. Digital cameras are increasing in sales by the quarter and video recorders have exceeded sales expectations despite lagging substantially behind the technology curve within their segment.

The following list describes the types of devices that need power, the examples include but are not limited to Laptops, Cell phones, FSR/GRS walkie-talkies, PDA's, Digital Cameras, MP3 players, iPods, Video Cameras, Wireless telephone charging stations, Computer peripherals (ext hard drives, DVD writers), Cable and DSL modems, Wireless hub/routers, RC Toys, Sprinkler systems, and/or Security cameras. These devices are just some of the devices that are power through a preferred embodiment.

Presently transformers are included with every electronic device that does not rely solely on alkaline batteries. These transformers are typically designed to specification overseas. Overseas firms build the transformer to the device manufacturer's specification, but the device manufacturer often leaves the transformer designs to the transformer manufacturer. The level of design and innovation is very low as the device firms are stressing low cost. This focus on low cost is a result of the common need for the transformer to be absorbed into the cost of the device. Today's best transformers have very little design focus. All are simple "blocks" with cords hanging out of them. The focus, in one embodiment, is placed on the mechanical and presentation aspects of the design of the transformer with an adapter plate. Building units that elegantly fit into the "kitchen office" space in a manner that organizes the clutter is as preferable as well as the power management capabilities.

Transformers have been used in several ways for businesses—some businesses find them simply as costs. For example, laptops come with transformers and the manufacturer has to include the transformer in its costs. Within the competitive world of laptops the transformer is a cost to be kept down. Other firms see these devices as possible revenue sources such as the cell phone industry which sells car adapters, and additional accessories as add-ons because these add-ons have begun to subsidize the costs of the phones.

All electronics need power of some sort to operate and function, so while the types of devices will change in appearance, function and abilities, the need for power is simply going to continue for as long as people use electronics. There is not even a remote trend within the industry to change sources of power. For example the auto industry could in theory convert entirely to a fuel-cell-based model and eliminate the need for gasoline. While solar power or even fuel cells present a theoretical alternative to AC or DC power source there has been little to no interest or market need to even consider switching. The result is a market for the extended future.

In one embodiment, a universal configurable transformer is designed to power any electronic device and has the ability to untangle the electronic cords that occur when attempting to charge multiple devices. These transformer devices would be sold once for each living unit although many possibilities exist that might cause multiple units to be sold. In an alternative embodiment, a variety of transformers are provided that would fit in different situations such as travel units, auto and car units, RV designed units, in addition to possible markets in hotels, airport lounges, offices, universities, libraries, hotels, coffee shops, etc. Once the primary transformer unit is installed many additional adapters could be connected that would allow for the charging and powering of everything from cell phones to PDAs to laptops, to batteries and more.

In one embodiment, a purpose of this transformer is to eliminate the countless transformers needed for all the household electronics, to reduce the clutter of the inevitable knotted wires and bulky plugs; and to allow for more places to charge electronics at a lower cost.

In one embodiment, a variable transformer is capable of accepting different adapters that will be capable of charging or powering different electronic devices. The transformer shall be programmable by some means such as the internet, a USB dongle, the charging adapter itself, 802.11 connection from a pc, Bluetooth, CF, SDIO or other mechanism as needed and becomes available. The programmable nature allows the transformer to provide power outputs of varying levels to meet the needs of different devices. Different versions of the transformer could be designed to allow for higher and lower output ranges, fewer and larger numbers of devices to be supported, surge protection and other power management needs.

In one embodiment, in addition to the transformer, an adapter is attached that has a device-specific connection. The adapter, where appropriate, has a retractable cord and/or it has a connection designed to accept a rechargeable battery. The adapter would provide the connection requirements to plug into potentially all electronic devices. Adapters can potentially provide more capabilities than simply charging and in alternate embodiments provide additional functionality such as the adapter itself can serve as a cameras, a set of speakers, a microphone, a router and/or hub, a timer, an alarm and/or any other household.

In one embodiment, the cluttered walls full of power cords are removed. Instead a device is provided capable of charging many devices at once without the need for multiple power strips or similar arrangement to allow for many plugs. This device provides interchangeability to allow for the charging of different types of devices such as cell phones, batteries and/or laptops. Further, the device will possess different aesthetic features to enable a harmonious fit into many different home decors. In an alternate embodiment a device is placed at a business location in order to provide device charging to customers, passengers and/or other visitors with many different devices.

In one embodiment the power supply used is a switched-mode power supply, which provides a more efficient power transformation than mechanical windings often provided to consumers. Further, multiple programmable options allow for varying power in many ways from over the internet, from PC in the house (wired or wireless), via USB or other media such as SDIO or CF.

In one embodiment, the design concept allows for a base unit, with different adapters and potentially appropriate aesthetic packaging. Interchangeable adapters allow for the continued selling of new adapters at lower cost. Interchangeable adapter plates allow for changes in the ability to hold adapters. A two unit plate could be upgraded to a unit with unlimited adapters. Different aesthetic packaging of adapters and plates allows for fits into different home styles and, in turn, marketing based on aesthetic values and not just technical values.

In one embodiment a transformer is mounted in a fixed position and/or is portable and can be relocated. The transformer is designed to fit into a standard electrical box in a home. It is preferably packaged in other form factors such as its own "electrical box" that allows for interchangeable plates. In alternate embodiments the transformer is packaged into a power strip type device but instead of receptacles it accepts different adapters.

In one embodiment there is an interchangeable core transformer to allow for upgrading and switching to meet different specific needs. The transformer is programmable by a range of mechanisms such as USB, Bluetooth, internet, etc. to allow for multiple and many different devices. A universal interface to the transformer allows for different adapters to be connected. Each adapter would fit different devices and or range of devices. The interchangeable adapter is not restricted to "plug" interfaces but also allows for batteries to be connected. Alternate embodiments allow for adapters with the ability to "rest" a device in the adapter. In alternate embodiments an adapter has a mechanism to hold the devices and electronics out of the way. In an alternate embodiment the adapters could be devices themselves. Possible devices include cameras such as in a baby's room or for any security need, speakers, microphones, timers, control units and other.

Figure 2:
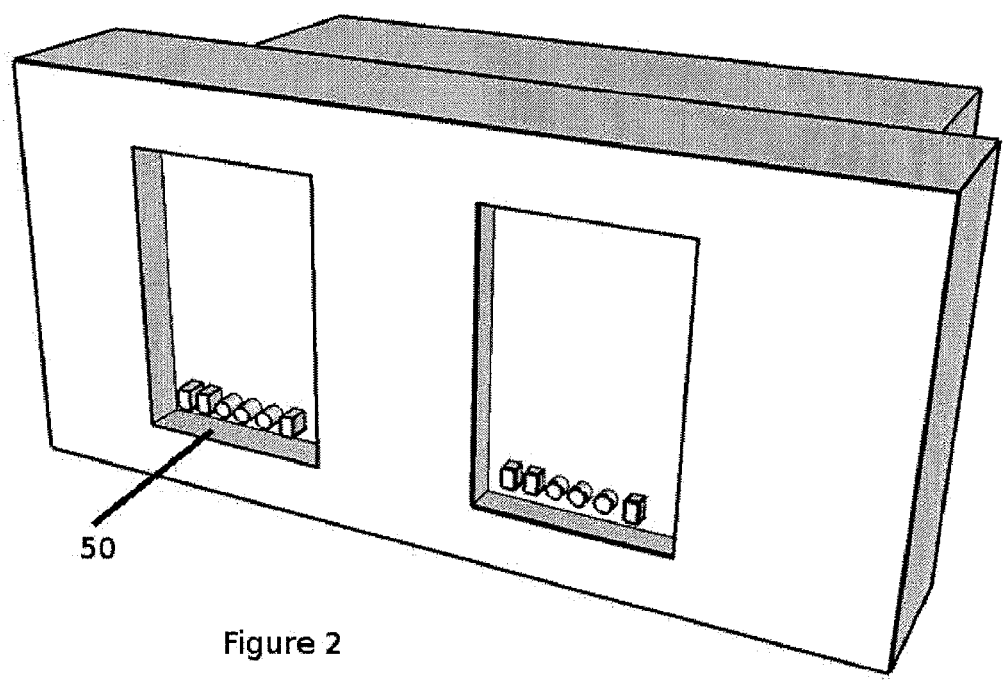
FIG. 2 shows a magnified depiction of an example transformer as shown in FIG. 1.

FIG. 1 illustrates a line drawing of an adapter and transformer in one embodiment. A transformer 40 is set into a wall in the space preferably occupied by a conventional power outlet. This transformer is configured such that it is connectable to the typical wiring in a home or business, and it is further configured to be placed in the area defined by a typical power outlet. The transformer is connected to an adapter plate through a series of connectors shown on the front of the transformer 40. These connectors are configured to operably attach to the back of an adapter plate 10. This adapter plate is of such size as to fit into the area defined by the transformer 40 and it has the connectors to fit with the connectors shown in transformer 40. The front 20 of the adapter is configured to contain a cord 30. This cord is used to connect to a particular device, such as, but not limited to, a cellular phone and/or a digital camera. FIG. 2 shows a transformer 50, which is a magnified depiction of transformer 40 shown in FIG. 1.

Further embodiments separate the components further. The transformer 40 could be split into several interchangeable components including a case or box to hold the transformer, the transformer itself which would be interchangeable to allow for other transformers to be placed inside, and the external face that the adapter plates were connected to which could also be modified. For example, to allow for fewer or more adapters.

Figure 3:
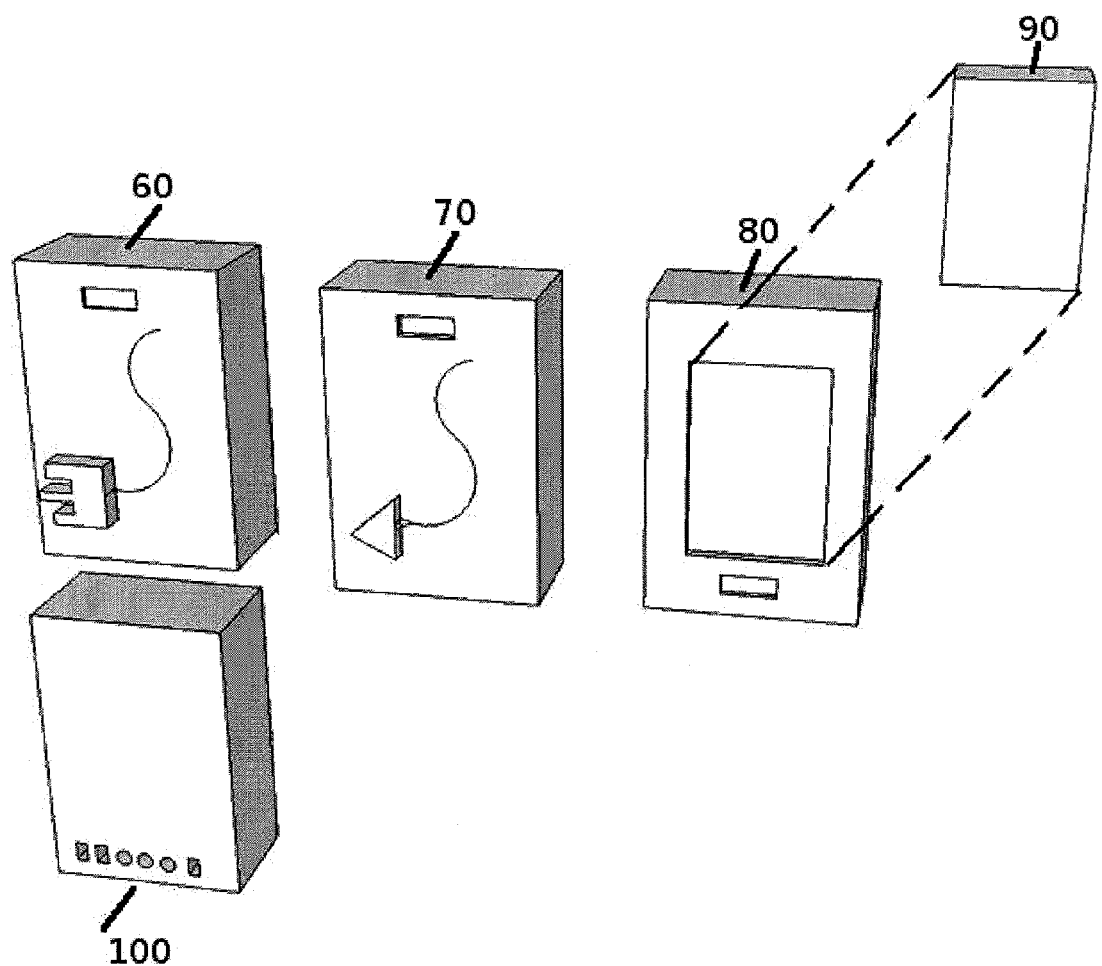
FIG. 3 illustrates a plurality of attachments that are used in a preferred embodiment.

FIG. 3 illustrates a plurality of attachments that are used in a preferred embodiment. Adapter 60 and adapter 70 show the ability to attach a plurality of retractable power cords, with a plurality of connectors to the adapter. Adapter 80 is configured to hold a battery 90, and to charge the battery directly in the wall. The back of the adapter 100 shows the connectors for connecting the adapters 60, 70 and 80 to a wall transformer.

Figure 4:
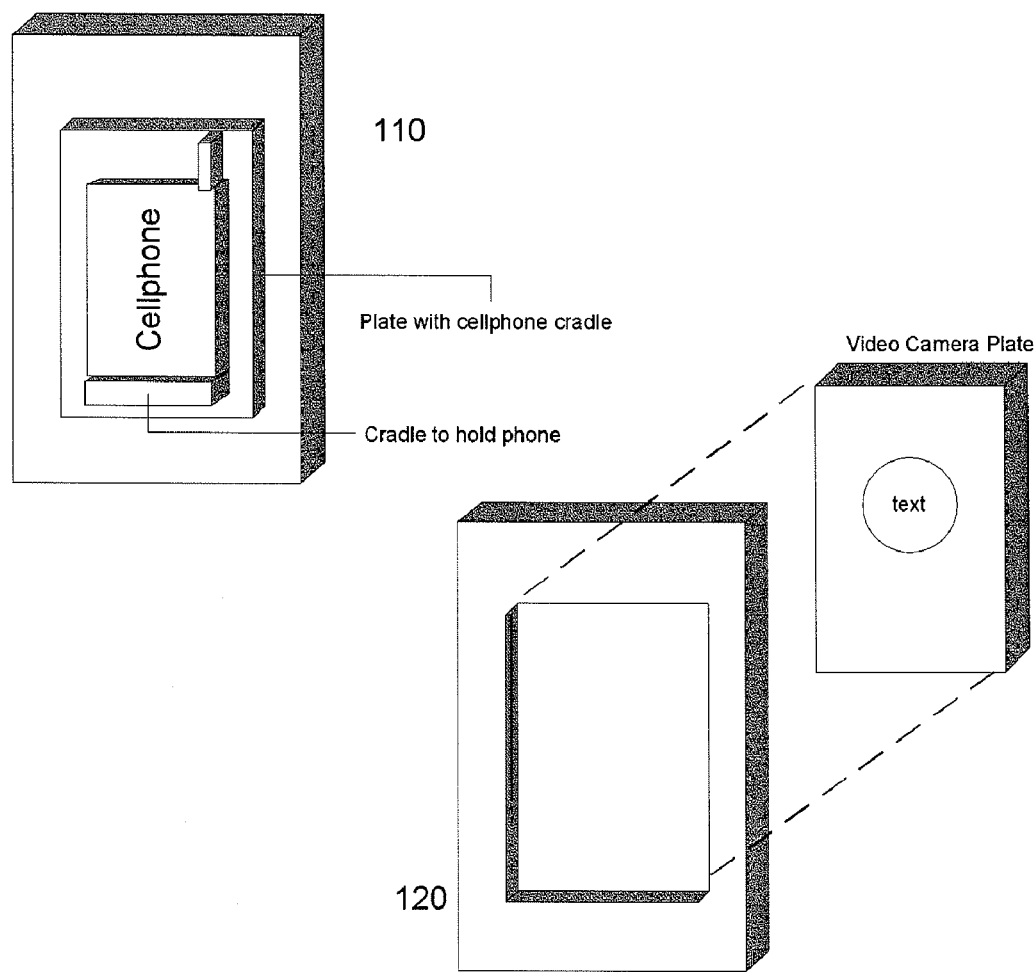
FIG. 4 illustrates different types of plates.
Figure 4:
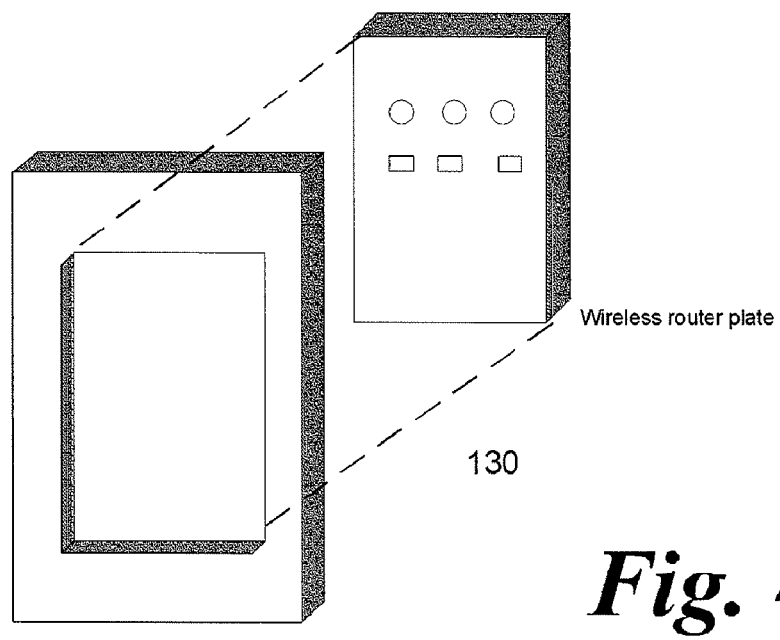

FIG. 4 illustrates different types of plates

Figure 5:
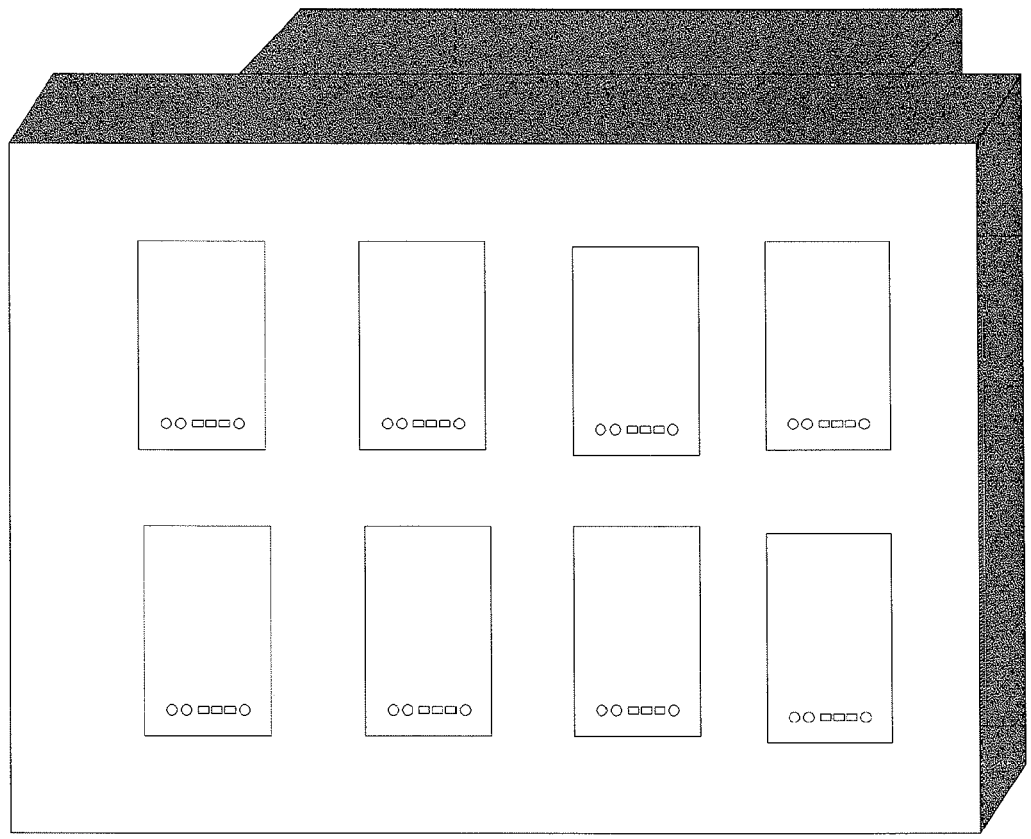
FIGS. 5 and 6 illustrate different housing configurations.
Figure 6:
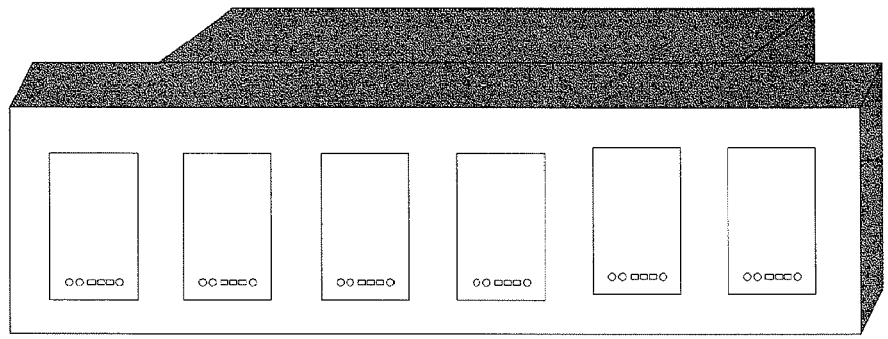

FIGS. 5 and 6 illustrate different housing configurations

In one business method embodiment, the foundation for the business model is to sell a universal configurable transformer that is designed to power any device and has the ability to completely untangle a plurality of wires used to power electronic devices. These devices would be sold once for each living unit although many possibilities exist that might cause multiple units to be sold. Every living unit has the potential for some variant, whether it is a home, condominium, or apartment. It is also possible to build a variety of transformers that would fit in different situations such as, but not limited to, travel units, auto and car units, RV designed units, in addition to possible markets in hotels, airport lounges, libraries, hotels, and/or coffee shops.

While the primary market is in the technology sector, a secondary market is the home building and interior design market. In a sense total consumer based sales are dependent upon remodels, new homes and finally all total home units in existence. In the US there are 115 million home units and 2 million new homes every year. Therefore, in one embodiment, homes can built and/or remodeled to include a plurality of adaptors and transformers. Further sales could include business or commercial fits such as places of employment, hotels, airport, coffee shops and other high traffic locations.

Once the adaptor has been sold, the company will sell adapters to fit the specific device or model that needs power. Every device needs a unique adapter as every cell phone; camera, etc has unique needs. Unless multiple family members have identical phones and do not need to charge their phones at the same time they will need at least three adapters. The target market for this component is equal to the total device units in the market itself. As the number and types of devices grow so will this segment of the business.

In one business method embodiment, a business model includes programming the transformers and adapters for the needs of the specific devices that will be attached. To do this the wall unit will need to be programmable by design and in turn programmed for a specific device. While it may be possible and even desirable to build the adapter with all the preferable components to both physically fit the device in addition to altering the power output out of the transformer, the present business model provides for internet downloading of programs and files. The user would type in an appropriate device from a wide selection of choices and the needed information would be downloaded either directly through wired or wireless means or indirectly using a USB drive and/or a flash card to enable programming of the transformer unit and adapter.

In one embodiment, the programming of the device will include a website. The first visit to the website would require some basic information about the user and their device while subsequent visits would only require identification of their new device. Bringing people to the website has many benefits for all involved. It will allow the company to provide value-added services such as automatically registering products for users if desired, which in turn allows users to receive updated firmware and software that all too often does not get received because someone failed "to fill out the card." The data gathered about the types of devices in use in a home can be used as a revenue source in many ways. Aggregated data could be sold to manufacturers as well as provide a customized advertising outlet. Knowing what devices a family is using enables us to structure the site for advertisers, manufacturers, and others.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A device configured to provide a charge to a battery, the device comprising:
   a housing mounted within an electrical junction box of a building wall, the housing having a generally planar front surface facing outwardly from the building wall;
   a transformer contained within the housing and powered by a power source within the wall;

at least one recess defined in the front surface of the housing, wherein the at least one recess comprises a recessed surface inwardly offset from the front surface of the housing, such that the at least one recess defines an offset depth in a perpendicular direction to the front surface of the housing;

at least one connector pin electronically connected to the transformer and extending outwardly from a wall of the at least one recess; and at least one adapter plate shaped to mate with the recess of the housing and in electrical communication with at least one connector pin and further configured to power an external device, wherein the at least one adapter plate defines a plate depth that is not greater than the offset depth of the at least one recess such that the at least one adapter plate does not extend beyond the front surface of the housing when inserted into the housing.

2. The device of claim 1 wherein the at least one adapter plate comprises a component to power an external device, the component extending beyond the front surface of the housing when the at least one adapter plate is inserted into the housing.

3. The device of claim 2 wherein the external device is at least one of a battery, a portable device, and a memory card reader.

4. The device of claim 1 wherein the adapter plate further comprises a retractable cord.

5. The device of claim 1 wherein the adapter plate is a video camera.

6. The device of claim 1 wherein the adapter plate is a wireless router plate.

7. The device of claim 2 wherein the adapter plate is configured to charge a specific device.

8. The device of claim 7 wherein the adapter plate is a configured to cradle a cellular phone.

9. The device of claim 1 wherein the transformer is programmable.

10. The device of claim 9 further comprising a plurality of recesses defined in the front surface of the housing, wherein a plurality of adapter plates are configured to power a plurality of external devices.

11. The device of claim 10 wherein the plurality of external devices are different devices.

12. The device of claim 4 wherein the retractable cord is a USB cord.

13. The device of claim 1 wherein the adapter plate is at least one of a light and motion sensors for the room, electronic thermometers and home "weather stations," wireless speakers, and night lights.

* * * * *